US007775880B2

(12) United States Patent
Downes, P.E.

(10) Patent No.: US 7,775,880 B2
(45) Date of Patent: *Aug. 17, 2010

(54) PARI-MUTUEL SPORTS WAGERING SYSTEM

(75) Inventor: David W. Downes, P.E., P.O. Box 8097, Marysville, CA (US) 95901

(73) Assignee: David W. Downes, P.E., Marysville, CA (US)

( * ) Notice: Subject to any disclaimer, the term of this patent is extended or adjusted under 35 U.S.C. 154(b) by 1084 days.

This patent is subject to a terminal disclaimer.

(21) Appl. No.: 11/478,257

(22) Filed: Jun. 29, 2006

(65) Prior Publication Data

US 2006/0246990 A1 Nov. 2, 2006

Related U.S. Application Data

(63) Continuation of application No. 11/097,649, filed on Apr. 1, 2005, now Pat. No. 7,094,151, which is a continuation of application No. 10/126,266, filed on Apr. 19, 2002, now Pat. No. 6,910,965.

(51) Int. Cl.
*A63F 13/00* (2006.01)

(52) U.S. Cl. ............................. 463/28; 463/25; 700/91

(58) Field of Classification Search ............. 463/25–26, 463/28–29, 40–42; 700/91–92
See application file for complete search history.

(56) References Cited

U.S. PATENT DOCUMENTS

| | | | | |
|---|---|---|---|---|
| 6,910,965 B2 * | 6/2005 | Downes | ....................... | 463/28 |
| 7,094,151 B2 * | 8/2006 | Downes | ....................... | 463/28 |

* cited by examiner

*Primary Examiner*—Peter DungBa Vo
*Assistant Examiner*—Alex F. R. P. Rada, II
(74) *Attorney, Agent, or Firm*—DLA Piper LLP (US)

(57) ABSTRACT

This invention relates to sports and event wagering, particularly to a new sport and event wagering game and system. This game and supporting system allows pari-mutuel wagering with respect to new areas other than horse or dog racing, which will expand the sports wagering industry to encompass new areas of interest and enjoyment to bettors. Specifically, pari-mutuel wagering is enabled with respect to the performance statistics of individual sport or event participants, combinations of sport participants, combinations of event participants, and sport teams. This wagering game is supported by an electronic system, which allows interaction with the game via various communications methods, remotely or in-person, which can allow or restrict wagering activity based upon bettor location.

19 Claims, 2 Drawing Sheets

* ITEMS WITH AN ASTERISK REQUIRE ACCOUNT/PASSWORD FOR ACCESS

PARI-MUTUEL SPORTS WAGERING SYSTEM

CROSS-REFERENCE TO RELATED APPLICATIONS

This application is a CON of claims the benefit of U.S. patent application Ser. No. 11/097,649, filed on Apr. 1, 2005 now U.S. Pat. No. 7,094,151, which is a continuation application of Ser. No. 10/126,266, filed on Apr. 19, 2002, now U.S. Pat. No. 6,910,965, all of which are incorporated herein by reference in their entirety.

FIELD OF THE INVENTION

The present invention is directed generally to wagering systems, and more particularly to wagering systems that involve pari-mutuel wagering on the performance statistics of sports teams, individual sports players or athletes, or groups of such players.

BACKGROUND OF THE INVENTION

Although the current landscape provides some options for the sports gaming enthusiast to wager on sports, the options that exist are limited. There is a continuing need for a sports wagering game that has the following attributes:

- High odds payout potential for every game, regardless of event type, game type, sport or length of game
- Allows a single correct choice to be a sufficient condition for payout eligibility, without, in addition, having to beat a house imposed handicap or spread
- No limitations with respect to choice of wagers or sport participants by the bettor
- Ability for the bettor to apply knowledge and skill
- Ability for the bettor to rely on random chance, if desired
- No requirement for the bettor to have an expert knowledge of a sport in order to be successful Currently choices for wagering on sports are limited by the drawbacks associated with fixed odds wagering. The profitability of providing fixed odds wagering on a given group of outcomes depends on the ability of the casino or "house" to reliably split the betting money into offsetting groups corresponding to each outcome as weighted by the odds offered by the house. The house needs to do this "offsetting" because with fixed odds wagering each individual player is in effect betting against the house. Accordingly, the ability of the house to minimize the risk to its own capital is limited by its ability to split the betting pool into appropriately weighted and offsetting groups. As a result of these limitations of fixed odds wagering, sports betting casinos typically offer sports betting in relation to only a very limited range of choices and do not commonly offer high odds payouts.

With respect to football, for example, the house conventionally sets a point spread, which is a point handicap placed against the perceived stronger team, in an attempt to attract an equal quantity of wagering on each team. With other sports, odds are conventionally set that have a higher level of payout for the perceived weaker team. From time to time the house may adjust the point spreads and payout odds offered on future sports wagers in an attempt to maintain a balance between wagers on both sides. However, for a given sports wager, the terms or payout odds are conventionally fixed, so that the bettor is in effect wagering against the house. With conventional fixed odds sports wagering, in order to hedge its risks and maintain profitability, the house must be able to reliably divide the betting money into offsetting groups.

Such fixed odds methods lack the flexibility to efficiently accommodate a sports wagering game structure involving a larger number of players.

SUMMARY OF THE INVENTION

The present invention improves upon typical casino sport wagering in part by incorporating a pari-mutuel wagering system and method. This type of wagering, although applied in horse and dog racing, is uncommon in other contexts.

Pari-mutuel betting (sometimes referred to as "para-mutual" betting) is a more efficient betting system than fixed odds wagering in that the house does not have to rely on its ability to divide the betting pool in order to avoid risk to its own capital. The term pari-mutuel derives from the French expression meaning "a wager among ourselves".

The basic principle of pari-mutuel wagering is that the winners share the total stakes wagered on an event minus a fixed commission for the house. Another way of stating this is that pari-mutuel wagering is a form of betting in which the losers' wagers (less a percentage for the house) are distributed among the winners. The bettors compete against each other rather than against the house. Although pari-mutuel wagering has been applied to horse race betting, it has not been applied to wagering on the performance of human sports players as proposed herein.

Unlike fixed odds wagering, with pari-mutuel wagering, the house does not win money directly from the players, but rather only collects a commission on wagers. While the house will not win money directly from the bettors in this type of system, it will not lose money to the bettors. The house inherently has a far lower level of risk to its capital with pari-mutuel wagering than with fixed odds wagering. This fact in turn means that, with pari-mutuel wagering, the house is much more able to offer a wide variety of betting options as well as betting options with high odds payouts than is the case with fixed odds wagering. The reason this is so is that the house's flexibility in providing betting options is not limited by the need to divide the betting stakes into offsetting groups in order to hedge the house's risk to capital.

By definition, pari-mutuel type wagering in essence is a system where all bettors are competing for a common pool of funds. Bettor skills are pitted against one another rather than against the house.

Wagering games according to the invention deal with the performance statistics of the human sport players and teams, which are much more plentiful in type and number than are game scores. These games and statistics often are related to the performance of a single player. By focusing on the performance of a single player, a bettor can more easily apply his or her skill and knowledge.

The invention offers the possibility of high odds payouts with every game offered, as opposed to the even money payouts typical of casino sports wagering. The bettor does not have to select a multi-event parlay in order to potentially receive a large odds payout. A single correct choice by the bettor may result in a high-odds payout without the handicap of a point spread. In addition, high odds payouts are possible, even if the selected player does not finish in first place, enhancing bettor enjoyment. Also, the bettor can place wagers on a wider number of finish positions, providing greater utility and enhancing the bettor's ability to apply knowledge and skill.

In addition, the invention does not rely on newspapers and other print media as the primary means to communicate how to interact with the game. In addition, the invention does not need a mechanical apparatus as the focus of bettor play and enjoyment. Rather the invention provides an automated, electronic design that allows improved communications accuracy of the individual games and estimated payouts, with rapid display of changing odds, player scratches, and the like. It is possible for bettors to enjoy the games enabled by the invention anywhere there is a communications connection.

According to one aspect of the present invention, a pari-mutuel wagering method is provided for enabling a plurality of bettors to place wagers on a human contest or sporting event. The method includes the steps of: offering to the bettors a plurality of wagering options pertaining to the human contest or sporting event; taking wagers from the bettors to create of pool of wagers on the human contest or sporting event; allocating a portion of the pool of wagers as commission to an operator; allocating the remainder of the pool of wagers as a common pari-mutuel fund for paying winning wagers; determining whether each wager is a winning wager; and paying each bettor an amount from the common pari-mutuel fund for each winning wager respectively made by the bettor.

According to another aspect of the present invention, a system for pari-mutuel sports wagering is provided. The system includes at least one processing element which is adapted to receive wagers on human sporting events, to calculate odds relating to the wagers based on a pari-mutuel wagering strategy, to determine whether the received wagers are winning wagers, and to determine a payout amount for the winning wagers based on the pari-mutuel wagering strategy; a plurality of linking elements which are communicatively coupled to the at least one processing element and which are adapted to allow for communication with the at least one processing element; and a plurality of input elements which are communicatively coupled to the plurality of linking elements and which allow bettors to communicate with the at least one processing element in order to place wagers.

The present invention enables these and many other benefits to be obtained.

DETAILED DESCRIPTION OF THE PREFERRED EMBODIMENTS

The present invention provides a pari-mutuel sports wagering system and method. In the preferred embodiment, the system and method are implemented on one or more computer systems and/or networks. Particularly, the system and method may be implemented using software, hardware, firmware or any combination thereof, as would be apparent to those of ordinary skill in the art, and the figures and examples below are not meant to limit the scope of the present invention. Moreover, where certain elements of the present invention can be partially or fully implemented using known components and processes, only those portions of such known components and processes that are necessary for an understanding of the present invention will be described, and detailed descriptions of other portions will be omitted so as not to obscure the invention.

Figure 1:
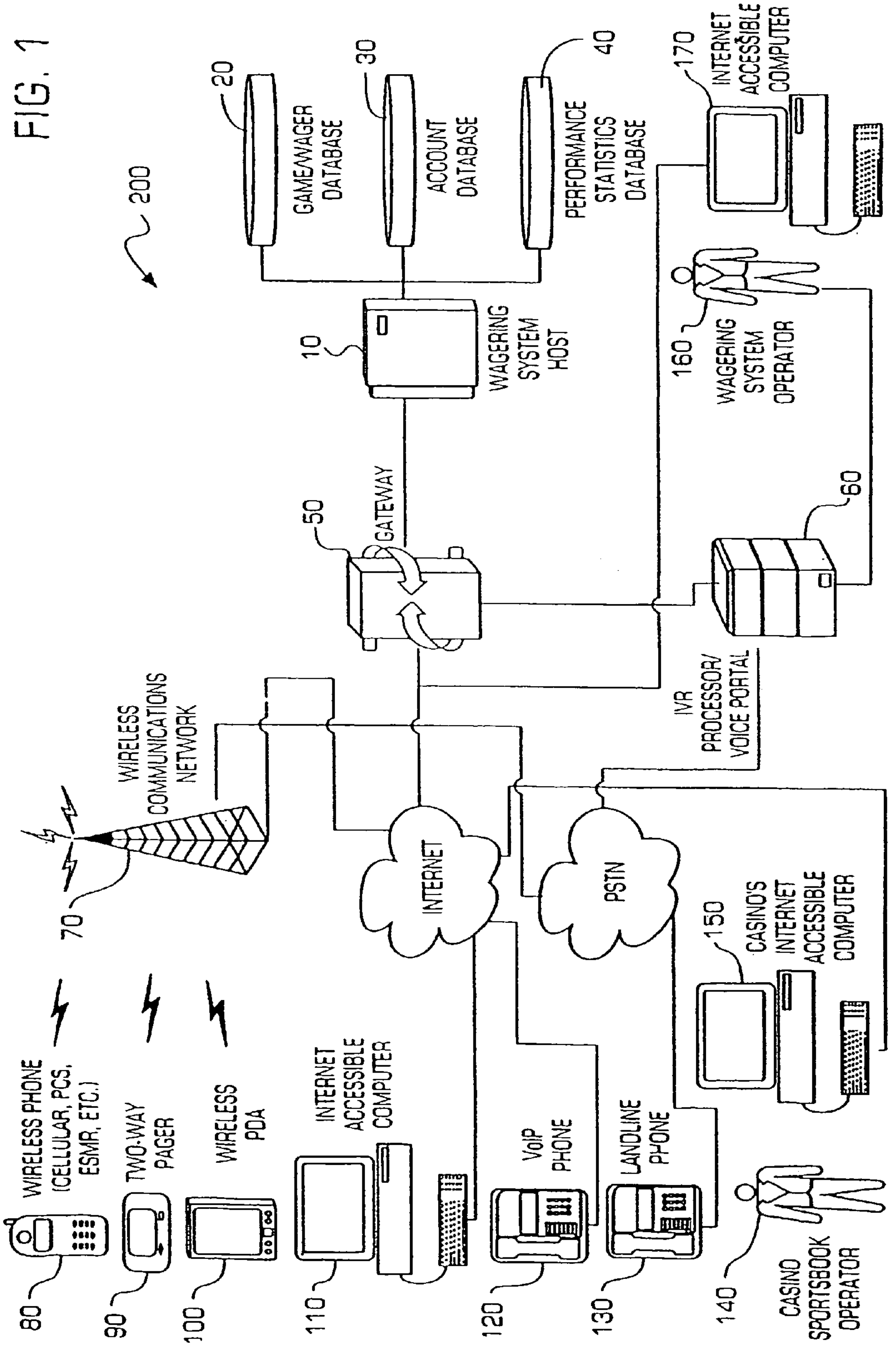
FIG. 1 is a diagram showing a preferred embodiment of the present invention implemented over alternative communication pathways.

The following description will include: (I) a discussion of the general architecture and function of a preferred embodiment of a pari-mutuel sports wagering system as shown in FIG. 1; (II) a detailed description of how a user may interact with the pari-mutuel sports wagering system; and (III) some examples of various embodiments of the sports wagering system corresponding to different types of sports betting.

I. General System Architecture and Function

FIG. 1 illustrates the general architecture of a sports wagering system 200, which is made in accordance with a preferred embodiment of the present invention, and which is implemented over a computer network.

The wagering system host 10 is the core processing element in the wagering game system, and is adapted to handle wagering, gaming and bettor accounting functions. Host 10 may comprise a conventional microprocessor based system and/or server. The game/wager database 20, account database 30 and performance statistics database 40 are communicatively coupled to host 10, which selectively accesses, maintains, updates and modifies the databases in a conventional manner. It should be appreciated that the wagering system host 10 need not be a single piece of equipment. Host 10 may comprise a combination of disparate devices that operate under together under stored program control to perform the described functions.

In the preferred embodiment, the system 200 is communicatively and operatively connected to various networks, such as the Internet, the Public Switched Telephone Network (PSTN), and the Public Switched Mobile Network (PLMN).

The system host 10 is programmed to segregate individual bettors and accept, process and pay wagers. Host 10 is able to electronically process wagers and payouts for individual bettors. The host 10 is further able to register individual bettors, create individual accounts, receive funds and disburse funds.

The system host 10 may be configured to allow or disallow access to wagering functionality based on bettor location, allowing wagering activity only in proper and legally permissible locations. The wagering game operator may have the ability to select, remove and modify the locations where access to gaming functionality is allowed.

In the preferred embodiment, the system host 10 will further be adapted to handle electronic transfers of funds associated with the operation of the wagering game to include, but not limited to, wire transfers, electronic funds transfer, credit cards, debit cards and smart cards. In addition, the system 200 will preferably have sufficient manual capability in order to allow manual handling of financial transactions associated with the operation of the wagering game. For instance, the system 200 may be adapted to handle the manual transfer of funds including, but not limited to, cash, checks, money orders, traveler's checks, credit cards, debit cards and smart cards. The majority of the manual handling will be comprised of wagering processing tasks performed by casino sportsbook personnel.

A bettor can access, interface with and place bets on system 200 by use of conventional wireless and landline communications devices, such as wireless phones 80, two-way pagers 90, personal digital assistants (PDAs) 100, internet-accessible computers 110, voice-over-IP (VoIP) phones 120, and conventional landline telephones 130.

System 200 may further include human interfaces, such as a casino sportsbook operator 140 and a wagering system operator 160, which the bettor can use to interface with the wagering system 200. The casino sportsbook operator 140 will usually interface with the wagering game system via an internet-accessible computer 150. The wagering system operator may interface with the wagering game system 200 via an internet-accessible computer 170.

Wireless communications network 70 provides a means or channel by which communications between the wireless devices and the wagering game system is established and a means or channel by which the wireless communications devices interface with the wagering game system 200.

System 200 further includes a conventional gateway 50, which acts as a communications and security interface for the host 10. System 200 may further include an IVR processor/voice portal 60, which may comprise a device or combination of devices that handle certain wagering game voice interface functions from bettors that are using voice devices.

The components of the wagering game system can be categorized into three basic elements: (A) input elements, (B) linking elements, and (C) processing elements. These elements will be discussed in more detail below.

A. Input Elements

The input elements include various communication devices used by bettors to interact with wagering system 200, such as wireless phones 80 (e.g., cellular, PCS, and the like), two-way pagers 90, personal digital assistants (PDAs) 100, internet-accessible computers 110, voice-over-IP (VoIP) phones 120, and conventional landline telephones 130.

The bettor can interface indirectly via personal interaction with a casino sportsbook operator 140. The casino sportsbook operator will interface directly with the wagering game system via one of the direct methods, usually via an internet-accessible computer 150. Hence, computer 150 may also be classified as an input element.

The bettor can interface indirectly via interaction with a wagering system operator 160. The wagering system operator 160 may be a casino sportsbook operator that interfaces with customers that communicate with the wagering game system via a voice network device such as a wireless phone, VoIP phone or landline telephone. This approach is a hybrid approach since the bettor uses electronic communications devices to verbally communicate with a live operator in order to interface with the wagering game system, with the wagering system operator interfacing with the wagering game system via one of the direct methods, usually via an internet-accessible computer 170. In this manner, computer 170 also acts as an input element.

B. Linking Elements

In the preferred embodiment of the present invention, system 200 includes several linking elements including wireless network 70, gateway 50, and portal 60. The linking elements may further include conventional wired networking elements, the internet, and other conventional communications conduits and elements. The linking elements are communicatively coupled to the input elements and the processing elements, and allow for communication between the input and processing elements, thereby allowing bettors to place wagers from the input elements onto the processing elements.

The wireless communications network 70 may comprise a number of base stations, base station controllers, mobile switches and gateways, and provides for communications between the wireless devices and the wagering game system established and the means or channel by which the wireless communications devices interface with the wagering game system.

The gateway 50 may comprise a conventional gateway device that acts as a communications interface and firewall. Gateway 50 ties the wagering game host and IVR processor/voice portal to the internet and internet-capable devices in a conventional manner.

The IVR processor/voice portal 60 may comprise a device or combination of devices that provides the interface functionality between certain input elements and the processing elements.

The IVR processor provides interface functionality to the processing elements for bettors using voice devices such as a wireless phone 80, VoIP phone 120 or landline phone 130. The IVR processor allows the bettor to interact with the wagering game by pressing numbers on a telephone keypad, which will allow the bettor to navigate the various menus and processes, place wagers, and perform other suitable interactions. The IVR processor allows direct interaction with the game from bettors using a wireless phone 80, voice-over-IP (VoIP) phone 120, or landline telephone 130.

The voice portal provides interface functionality to the processing elements for bettors using certain internet-capable devices such as two-way pagers 90 or wireless PDAs 100. The voice portal allows the bettor to interact with the wagering game by speaking directly into the telephone. The voice portal has the ability (e.g., through conventional speech recognition software) to recognize speech and take action based on that speech. Typical actions include such tasks as navigating selection menus, placing bets, entering passwords, and the like. The voice portal may also have the ability to recognize a particular bettor, through his or her speech, adding an additional layer of security.

C. Processing Elements

The wagering system host 10 is the core processing element in the wagering game system, handling wagering gaming and bettor accounting functions. The wagering system host handles the processing functions associated with bettors' wagering accounts. Such functions may include game accounting, wager accounting, odds determination, winning wager determination, payout determination, system security, access permission and performance statistics accounting.

The wagering system host 10 may be a single server, device, or a combination of devices that collectively perform the functions described. The wagering system host's processing ability can be scaled in order to meet bettor demand with respect to the described functions. In addition, the wagering system host's processing ability can be scaled in order to meet bettor demand with respect to a particular game or demand with respect to new games.

The game/wager database 20 is a database and storage element for the wagering game system. The game/wager database 20 is connected to, and functions in conjunction with, the wagering system host 10, the account database 30 and the performance statistics database 40.

The game/wager database 20 stores information regarding current and past games, such as type of game, game field, amounts wagered per game field participant per type of wager, calculated odds, game results and game payouts. The game/wager database 20 stores information regarding the wagers for current and past games, such as wager records by bettor account number, wager records by game and wager history by bettor account number. The account database 30 is a database and storage element for the wagering game system. The account database 30 is connected to, and functions in conjunction with, the wagering system host 10, the game/wager database 20 and the performance statistics database 40.

The account database 30 stores information regarding individual bettor accounts. The information stored includes financial transaction history, wager history, payout history, financial withholding information, financial reporting information and current wagers.

The performance statistics database 40 is a database and storage element for the wagering game system. The performance statistics database 40 is connected to, and functions in conjunction with, the wagering system host 10, game/wager database 20 and the account database 30.

The performance statistics database 40 stores information regarding the statistical performance of sport or event participants that are related to current and past games. The information stored would include all statistics that are pertinent to current and past games that are involved in the processing of ranking participants in order to determine wagers eligible for payout. Historical performance statistics covering periods of time before offering particular wagering games may be stored in order to provide additional information so bettors can make more informed decisions, enhancing the ability of bettors to employ knowledge and skill.

D. Interfacing with Wagering System 200

In operation, a bettor can interact with the wagering system 200 by interfacing either directly or indirectly with the wagering system host 10. Having several independent interface methods and conduits allows bettors more convenience and availability, greater control of the gaming experience and greater enjoyment.

The bettor can interface indirectly with the system through personal interaction with a casino sportsbook operator 140. The casino sportsbook operator may in turn interface directly with the wagering game system by way of one of the direct methods, usually through an internet-accessible computer 150. In such case, the casino sportsbook operator will perform the wagering processing function as an intermediary between the bettor and the system 200.

The bettor may also interface indirectly through interaction with a wagering system operator 160. The wagering system operator is a casino sportsbook operator that interfaces with customers that communicate with the wagering game system via a voice network device such as a wireless phone, VoIP phone or landline telephone. This approach is a hybrid approach since the bettor uses electronic communications devices to verbally communicate with a live operator in order to interface with the wagering game system, with the wagering system operator interfacing with the wagering game system by a direct method, usually via an internet-accessible computer 170. The wagering system operator will interface with the wagering game system as an intermediary between the bettor and the system.

E. Typical Wagers that can be Placed Through System 200

In the preferred embodiment, system 200 is adapted to allow bettors to wager on human sporting events. In this context, the term "human sporting events" should be understood to include sports or sporting events in which the primary participants (e.g., athletes) are humans, as opposed to horse and dog-racing, where the primary participants are animals. Examples of such human sporting events and wagers that may be established for such events are set forth below in Section III.

Wagers according to the present invention may typically fall into two broad categories. For a particular wagering game, a bettor can make the various wagers with regard to participants' (e.g., athletes') performance statistics with respect to the rest of the betting field. Various examples of the types of statistics and games that may be implemented through system 200 are set forth in Section III below. Based upon the participants' performance, the participants may be ranked by system 200 relative to other participants. Some examples of rankings are shown below:

| Finish Position | Finish Position (Reference Name) |
|---|---|
| First Place | Win |
| Second Place | Place |
| Third Place | Show |
| Fourth Place | Clear |
| Next to Last Place | Lag |
| Last Place | End |

This assumes that there are sufficient participants in the betting field that there is no possibility of a participant filling more than one payout position For example, in a two participant field, the first place finisher is also the next to last place finisher. Not all of the shown wagers may be allowed, or more wagers may be allowed, based on field size and bettor interest. Note that the position wagers shown here are not the only wagers of this type possible. For example, position wagers for fifth place, six place, and the like, are possible, depending on field size and bettor interest.

For a particular wagering game, a bettor can make the following wagers with regard to two or more participants' performance statistics with respect to the rest of the betting field for that game:

| Finish Position | Name of Wager (Reference Name) |
|---|---|
| First and Second Place | Exacta |
| First, Second and Third Place | Trifecta |
| First, Second, Third and Fourth Place | Perfecta |
| Last and Next to Last Place | Closing |

Note that the position wagers shown here are not the only wagers of this type possible. For example, wagers on first place through fifth place, etc., are possible, depending on field size and bettor interest. Also, wagers predicting the finish positions of players in reverse order or wagers that payout based on the selected players all finishing in the selected range, or in any order, are possible.

F. Wagers Eligible for Payout

In general, to be eligible for payout, the bettor's wager must be correct. For example, an Exacta wager for Player A to win and Player B to place is eligible for payout only if Player A finishes in first and Player B in second. As opposed to contest games, the bettor does not have to prevail over other bettors; the bettor only has to be correct.

In some cases, similar to pari-mutuel wagering systems used in horse racing, a bettor's wager may be eligible for payout if the bettor's wager is partially correct. For example, a wager for Player A to show would be eligible for payout if the player finishes in first, second or third. The wager is not eligible for payout if the player finishes in a position less than third.

Example Wagers Eligible for Payout:

| Type of Wager | Wager Eligible for Payout if |
|---|---|
| Win | Selected player finishes first |
| Place | Selected player finishes first or second |
| Show | Selected player finishes first, second or third |
| Clear | Selected player finishes first, second, third or fourth |
| Lag | Selected player finishes next to last or last |
| End | Selected player finishes last |
| Exacta | Selected players finish first and second in order |

-continued

| Type of Wager | Wager Eligible for Payout if |
|---|---|
| Trifecta | Selected players finish first, second and third in order |
| Perfecta | Selected players finish first, second, third and fourth in order |
| Closing | Selected players finish last and next to last in order |

The types of wagers eligibility for payout can be expanded or reduced, depending on the field size and bettor interest.

G. Additional Host Functionality

Host 10 may further include some additional capabilities that are described below. The capabilities described herein are not to be assumed to be inclusive of the full capabilities or sole capabilities of the host 10.

In the preferred embodiment, the host 10 may have the capability to uniquely identify each game and uniquely identify every betting pool corresponding to each game. The host 10 will automatically register the total amount wagered in each betting pool, register the total amount wagered on each entry in a game for each finish position (e.g., win, place) and combinational finish position offered (e.g., exacta, trifecta).

The host 10 may further have the ability to segregate a portion of the amounts wagered in the various betting pools as the house pool and calculate approximate odds and payouts based on the betting pools after taking the deduction of the house pool funds into account. The mathematical and statistical algorithms that are used to perform these calculations are well known in the art of pari-mutuel wagering.

The host 10 may further have the ability to generate sufficient records of individual wagers to properly handle the various means of placing wagers as well as properly handle the various means of paying winning wagers and refunds, if necessary.

The host 10 may periodically update or recalculate the total amounts in each pool, the amounts wagered on each entrant or combination and the resulting payouts as wagering progresses. The host 10 may further have the ability to export those calculations to various devices for the purpose of displaying the winning odds on each entrant or combination during the progress of wagering.

The host 10 may also be adapted to terminate acceptance of additional wagers at the start of the first event that is involved in the outcome of a particular game.

H. Sample Payout Calculation Methodologies

Although not inclusive, the host 10 may calculate payouts based upon various calculation methodologies specific to a particular finish position. For purposes of illustration, calculation methodologies for win, place and show are described. Payout odds are determined by the amounts in the betting pools after taking the house pool deduction into account. As previously described, the host 10 may periodically update or recalculate payouts as wagering progresses and may be adapted to export those payouts to various devices for display purposes.

In one embodiment, host 10 calculates the following payouts for the following wagers, which are described above in section F:

First Place ("Win")

The payoff amount per dollar wagered (which will include the gross dollars wagered on the winner) for each gross dollar wagered on the winner is determined by dividing the win betting pool by the sum wagered on the winner.

Second Place (Place)

A. The payoff amount per dollar wagered on the winning entrant, which will include the gross dollar wagered upon the winning entrant to place, will be determined by:

dividing the amount wagered upon the winner to place into the sum of: the amount wagered upon the winner to place, plus one-half of the difference between the place betting pool and the combined sum wagered on the winning and placing entrants to place.

B. The payoff amount per dollar wagered on the placing (i.e., second place) entrant, which will include the gross dollar wagered upon the placing entrant to place, will be determined by:

dividing the gross amount wagered upon the placing entrant to place into the sum of: the gross amount wagered upon the placing entrant to place, plus one-half of the difference between the place betting pool and the combined sum wagered on the winning and placing entrants to place.

Third Place (Show)

A. The payoff amount per dollar wagered on the winning entrant, which will include the gross dollar wagered upon the winning entrant to show, will be determined by:

dividing the gross amount wagered upon such winning entrant to show into the sum of: the gross amount wagered on the winning entrant to show, plus one-third of the difference between the show betting pool and the combined sums wagered on the entrants which placed first, second, and third to show.

B. The payoff amount per dollar wagered on the second place entrant, which will include the gross dollar wagered upon the second place entrant to show, will be determined by:

dividing the gross amount wagered upon such entrant to show into the sum of: the gross amount wagered on the second place entrant to show, plus one-third of the difference between the show betting pool and the combined sums wagered on the entrants which placed first, second and third to show.

C. The payoff amount per dollar wagered, which will include the gross dollar wagered upon the third place entrant to show, will be determined by:

dividing the gross amount wagered upon such entrant to show into the sum of: the gross amount wagered on the third place entrant to show, plus one-third of the difference between the show betting pool and the combined sums wagered on the entrants which placed first, second and third to show.

Other mechanics and calculations of pari-mutuel wagering are well known to those skilled in the art and need not be discussed in further detail.

II. Interacting with the Wagering System

Bettors may interact with system 200 in order to perform the following tasks:

1. Establishing, withdrawing and replenishing accounts
2. Selecting particular sport or event wagering games
3. Examining performance statistics
4. Examining odds
5. Placing wagers
6. Collecting winning wagers and account funds Depending upon the input element chosen by the bettor, some tasks may be performed in different manners. For example, when the bettor communicates directly with a sportsbook operator, the gaming process, from the bettor's viewpoint, will be predominantly manual, with the bettor communicating directly with a human operator. When the bettor uses an electronic input element, IP compliant signals, human voice or DTMF signals will be the predominant means of performing these tasks.

Internet protocol technology, m-commerce systems, e-commerce systems, voice response systems, voice recognition systems and voice portal systems are well known in the art and need not be described in detail here. These technologies and systems are used by the input, linking and processing elements previously described and additionally shown in FIG. 1.

A. Selected Task Lists by Interface Method

For illustrative purposes, selected tasks that may be performed by a bettor in the various interface methods are listed below. These lists are non-exhaustive and should not be considered to imply that all of the tasks illustrated are needed to implement the new wagering game or that the items shown are the only items that may be used to implement the illustrated tasks.

1. In Person

If the bettor wishes to place wagers on a cash basis in person in a casino sportsbook, no account needs to be established. The bettor can place cash wagers on the games offered by the casino following the procedures established by the casino sportsbook.

Establishing a Wagering Account

Figure 2:
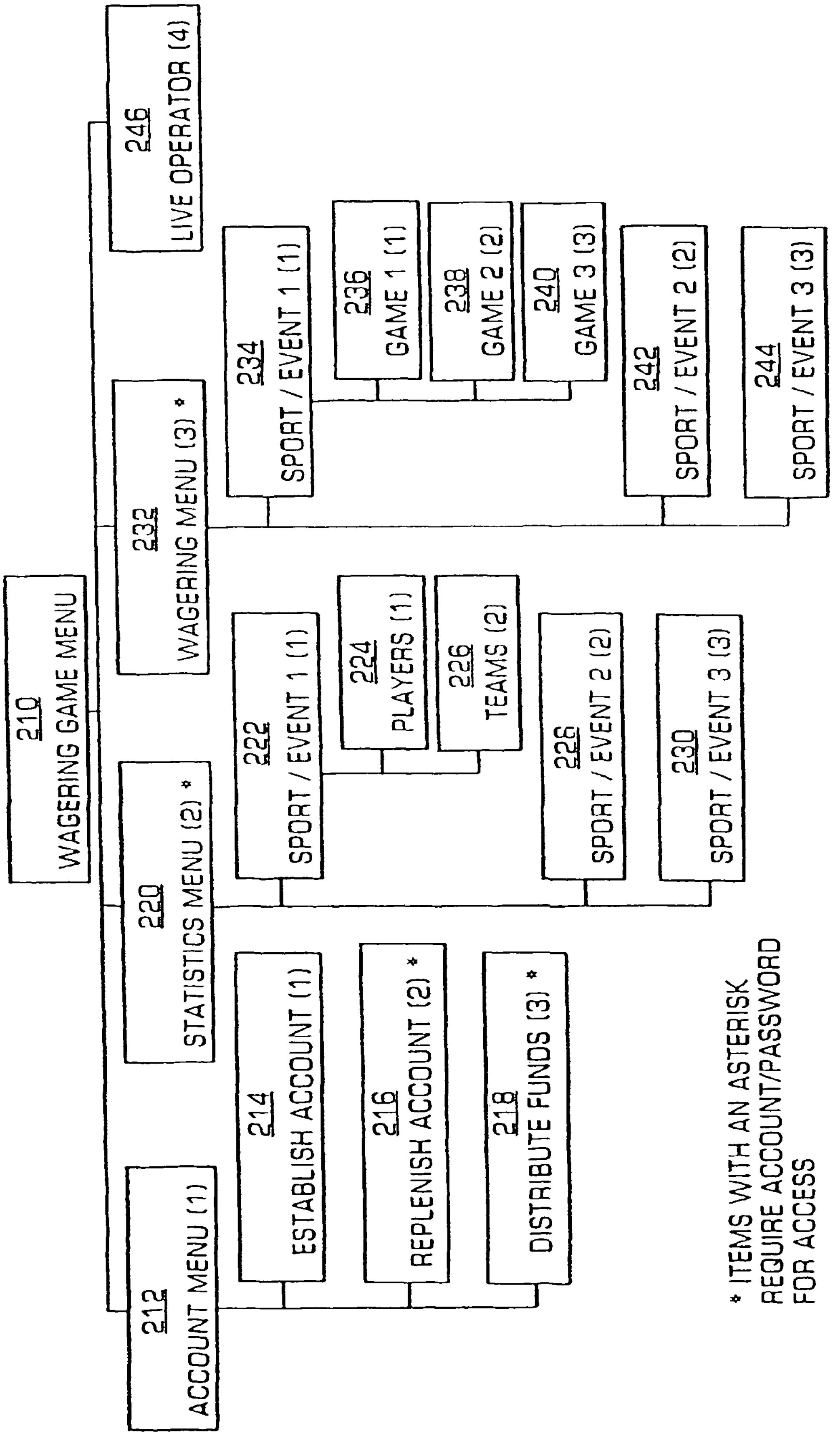
FIG. 2 is a block diagram showing a sample menu structure representing a telephone interface for use by a bettor according to another aspect of the invention.

The following steps may be performed in order for a bettor to establish a wagering account in person through a wagering system operator:

a. Bettor provides personal identification information
b. Wagering system operator sets up bettor's account
c. Wagering system operator provides account information to bettor
d. Bettor communicates amount of initial deposit
e. Bettor provides initial deposit
f. Wagering system operator provides deposit confirmation to bettor Placing Wagers The following steps may be performed when a bettor places wagers in person through a wagering system operator:

a. Bettor communicates wager to wagering system operator
b. Bettor communicates account information to wagering system operator
c. Wagering system operator inputs account and wager information into wagering system
d. Wagering system operator provides wager confirmation/receipt to bettor Collecting Winning Wagers and Account Funds The following steps may be performed for a bettor to collect wagers and account funds through a wagering system operator:

a. Bettor provides account information to wagering system operator
b. Bettor requests amount of funds to disburse
c. Wagering system operator confirms that sufficient funds are available
d. Wagering system deducts funds from bettor's account
e. Wagering system operator pays requested funds to bettor 2. Telephone Interacting with the game system via telephone may be accomplished by the bettor interfacing with a menu-based, interactive voice response system (IVR) with the option of speaking to a live operator. FIG. 2 is a block diagram of an example of a menu structure that may be implemented within the present invention as a telephone interface for use by bettors.

Establishing a Wagering Account

The following steps may be performed in order for a bettor to establish a wagering account over a telephone:

a. Bettor accesses wagering system telephone menu (e.g., block 210)
b. Bettor selects account menu (e.g., block 212)
c. Bettor provides personal identification information
d. Wagering system sets up bettor's account (e.g., block 214)
e. Wagering system provides account information to bettor
f. Bettor communicates amount of initial deposit
g. Bettor provides payment information
h. Wagering system provides deposit confirmation to bettor Placing Wagers The following steps may be performed in order for a bettor to place wagers over a telephone:

a. Bettor accesses wagering system telephone menu (e.g., block 210)
b. Bettor selects wagering menu (e.g., block 232)
c. Bettor inputs account access information to wagering system
d. Bettor selects sport of interest (e.g., block 234, 242 or 244)
e. Bettor selects type of game (e.g., block 236, 238, or 240)
f. Bettor selects type of bet
g. Bettor selects desired player or team
h. Bettor inputs amount of bet
i. Wagering system checks account balance to verify sufficient funds available
j. If sufficient, wagering system deducts amount of bet from bettor's account
k. Wagering system creates bet record in game/wager database and account database
l. Wagering system provides wager confirmation to bettor Collecting Winning Wagers and Account Funds The following steps may be performed in order for a bettor to collect winning wagers and account funds over a telephone:

a. Bettor accesses wagering system telephone menu (e.g., block 210)
b. Bettor selects account menu (e.g., block 212)
c. Bettor selects distribution menu (e.g., block 218)
d. Bettor inputs account access information to wagering system
e. Bettor inputs amount of funds to disburse
f. Wagering system checks account balance to verify sufficient funds available
g. If sufficient, wagering system deducts amount of bet from bettor's account
h. Wagering system processes disbursement
i. Wagering system provides disbursement confirmation to bettor The bettor may also receive statistics by selecting a statistics menu (block 220). The statistics menu will allow the bettor to obtain statistics related to various sports or sporting events by selecting a specific sport or event (e.g., block 220, 228 or 230). Once a bettor has selected the event, the bettor can also obtain statistics relating to individual players and teams by selecting a player (e.g., block 224) or team (e.g., block 226).

As shown in FIG. 2, blocks including an asterisk (*) require an account and password to access. Furthermore, all of the foregoing interactions can be performed through a live operator if the bettor selects the live operator menu (e.g., block 246).

3. Internet

Interacting with the game system via the internet may be accomplished by the bettor interfacing with the game system or casino website. The websites will have the appropriate links to allow the bettor to appropriately interface with the game system.

Establishing a Wagering Account

The following steps may be performed in order for a bettor to establish a wagering account over the internet:

a. Bettor accesses wagering game website b. Bettor selects account establishment link c. Bettor inputs personal identification information d. Wagering system sets up bettor's account e. Wagering system provides account information to bettor f. Bettor inputs amount of initial deposit and payment information g. Wagering system processes payment and credits bettor's account h. Wagering system provides deposit confirmation to bettor Placing Wagers The following steps may be performed in order for a bettor to place wagers over the internet:

a. Bettor accesses wagering game website b. Bettor selects wagering link c. Bettor inputs account access information into wagering system d. Bettor inputs wager information and wager amount into wagering system e. Wagering system checks account balance to verify sufficient funds available f. If sufficient, wagering system deducts amount of bet from bettor's account g. Wagering system creates bet record in game/wager database and account database h. Wagering system provides wager confirmation to bettor Collecting Winning Wagers and Account Funds The following steps may be performed for a bettor to collect winning wagers and account funds over the internet:

a. Bettor accesses wagering game website b. Bettor selects account link c. Bettor selects distribution menu d. Bettor inputs account access information into wagering system e. Bettor inputs amount of funds to disburse f. Wagering system checks account balance to verify sufficient funds available g. If sufficient, wagering system deducts amount of bet from bettor's account h. Wagering system processes disbursement i. Wagering system provides disbursement confirmation to bettor III. Examples of Pari-Mutuel Wagering Applications This section provides some examples of specific pari-mutuel wagering applications that can be performed by the present pari-mutuel wagering system and method.

A. National Football League

For purposes of illustration, an embodiment of a wagering game according to the present invention will be described with respect to the National Football League (NFL). Wagers may be placed on where an individual player's statistics will rank compared to the statistics of other players of the same position (e.g., $1^{st}$, $2^{nd}$, $3^{rd}$). The positions of highest interest are likely those offensive positions used as a basis for fantasy football games. These positions may include quarterback, running back, wide receiver, tight end and kicker. Each position may be the basis of a game, with time, player grouping, team and statistical methodology variants. Certain defensive player positions as well as team offensive and defensive statistics can also be the basis of a game.

Example

Quarterback Game

Time-based Game (Baseline Game)

In this game, the bettor may place wagers on where a particular quarterback's statistics will rank (e.g., $1^{st}$, $2^{nd}$, $3^{rd}$) compared to other quarterbacks for a given period of time. Suitable time periods may include:

Pre-season (e.g., all pre-season games)

Post-season (e.g., playoffs and Super Bowl)

Weekly (e.g., each week during the 17 week NFL regular season)

Monthly (e.g., games played in Sep., Oct., Nov. and Dec.)

Quarter season (e.g., weeks 1-4, weeks 5-8, weeks 9-12 and weeks 13-17)

Half season (e.g., weeks 1-8 and weeks 9-17)

Providing many choices of time-based games enhances bettor enjoyment because the bettor can participate during the pre-season, regular season and post-season to any extent desired. Providing many choices for time-based games also permits a more varied application of bettor knowledge and skill because the skilled bettor can use his or her knowledge of the strength of the NFL schedule, bye weeks, player injury, team standings, and the like, to adjust his or her betting strategy among the various games.

The field for each game could contain all quarterbacks, regardless of standing with respect to being on an active NFL roster or being a free agent. However, although all quarterbacks are eligible for wagers, for ease of playability, the house may designate a number of quarterbacks for discrete wagers, with all other quarterbacks as a single combined entity as "other." In this manner, the bettor can place wagers on any quarterback.

All games may have a time-based component, whether the component is a single event, game, season, or the like.

Example

Player Grouping Game

In this game, the bettor can place wagers on where a particular grouping of quarterbacks' statistics will rank (e.g., $1^{st}$, $2^{nd}$, $3^{rd}$) compared to other groupings of quarterbacks for a given number of games. The player grouping-based game can be combined with the various time-based variants to create more games.

Assume, for example, that in the National Football League, there are 32 teams. Sixteen groups of two players could become the field for the game. Other pairing combinations could be used to create additional games. Another game could include all quarterbacks in a particular NFL division or NFL conference as a group.

There are variants with respect to determining the top performers. One variant ranks the groups by using the best performance statistics from the various groups' quarterbacks.

Another variant combines the performance statistics of all the quarterbacks in a group before ranking the groups.

Example

Team-Based Game

In this game, the bettor can place wagers on where the combined quarterback statistics for an entire team will rank (e.g., 1st, 2nd, 3rd) compared to the combined quarterback statistics of the other teams for a given number of games. The team-based game can be combined with the various time-based variants to create more games.

This variant is different from the player grouping-based game because quarterback statistics contributed by all players is included. In other words, quarterback statistics accrued by non-quarterbacks is included in the ranking determination. This variant will have more utility when played with respect to rushing statistics and receiving statistics. It is more common to have quarterbacks and receivers run the ball and more common to have running backs catch the ball than it is to have running backs and receivers throw the ball.

Statistical Performance Measures and Variants

Statistical performance measures may be used to rank quarterbacks and groups to determine place of finish. Different performance criteria and weightings may be used to create different games, enhancing player utility, enjoyment and ability to apply knowledge and skill. As described, each game has a statistical performance scoring methodology in order to be able to rank performances.

For the quarterback games, a quarterback's statistical measures such as passing yards, pass completions, completion percentage, interceptions and touchdown passes can be used in various weightings to determine a score that can be ranked against others. In some games, other measures such as rushing yards and rushing touchdowns can be included.

For games involving the other positions, statistical measures applicable to those positions will be used. Rushing yards and touchdowns for running backs, receiving yards and touchdowns for wide receivers and tight ends, field goals and extra points for kickers, and the like, are measures that are typically associated with those positions and may be included as part of the scoring formulae for those positions.

Typical Quarterback Scoring Formulae

| Example 1 - Pass performance: | |
|---|---|
| Passing yards | 0.04 points per yard |
| Passing touchdowns | 3 points each |
| Pass completions | 0.1 point each |
| Pass interceptions | minus 1 point each |
| Completion percentage | >=65% - 2 points |
| | >=60% - 1 point |
| | >=50% - 0 points |
| | <=50% - minus 2 points |

| Example 2 - Total performance: | |
|---|---|
| Passing yards | 0.04 points per yard |
| Rushing yards | 0.1 point per yard |
| Passing touchdowns | 3 points each |
| Rushing touchdowns | 6 points each |
| Pass completions | 0.1 point each |
| Pass interceptions | minus 1 point each |

A sample quarterback performance is calculated under both given scoring criteria. Quarterback John Doe's performance for a game is as follows:

| | |
|---|---|
| Pass attempts | 30 |
| Pass completions | 18 |
| Passing yards | 220 |
| Passing touchdowns | 2 |
| Pass interceptions | 1 |
| Rushing yards | 15 |
| Rushing touchdowns | 1 |

Under the scoring formula shown in Example 1, John Doe's score would be (0.04*220)+(3*2)+(0.1*18)+(−1*1)+(1) or 16.6. Under the scoring formula shown in Example 2, John Doe's score would be (0.04*220)+(0.1*15)+(3*2)+(6*1)+(0.1*18)+(−1*1) or 23.1. This shows that depending on scoring methodology, there can be a wide variance of results based on the same performance. In these examples, one formula emphasizes throwing performance while the other recognizes the full contribution of the quarterback. The bettor can apply his or her skill and knowledge to place wagers on quarterbacks that reflect these differences, depending on the particular game the bettor is playing.

Sample Portfolio of Quarterback Games

To illustrate the large number of games available, providing greater bettor utility and enjoyment, a sample portfolio of the "Weekly" Quarterback Game is shown; by using what sample variants have been previously discussed as a guide. As stated earlier, the "Weekly" game is a game conducted each week during the NFL regular season. The time interval of interest is one week's slate of games. The games are:

1. Individual quarterback, Pass performance
2. Individual quarterback, Total performance
3. Combination quarterback, Best performance, Pass performance
4. Combination quarterback, Best performance, Total performance
5. Combination quarterback, Combination performance, Pass performance
6. Combination quarterback, Combination performance, Total performance
7. NFL Division combination quarterback, Best performance, Pass performance
8. NFL Division combination quarterback, Best performance, Total performance
9. NFL Division combination quarterback, Combination performance, Pass performance
10. NFL Division combination quarterback, Combination performance, Total performance
11. NFL Conference combination quarterback, Best performance, Pass performance
12. NFL Conference combination quarterback, Best performance, Total performance
13. NFL Conference combination quarterback, Combination performance, Pass performance
14. NFL Conference combination quarterback, Combination performance, Total performance
15. Team quarterback, Pass performance
16. Team quarterback, Total performance Just with the limited number of variants mentioned, 16 different quarterback games may be simultaneously offered each week during the NFL regular season. This number may be higher if more combinations of quarterbacks and more scoring methodologies are offered.

By considering the other time-based and player position variants that are possible, the bettor who has a wagering interest in this sport will have an extremely large selection of games from which to choose during the entire NFL season, not just at the beginning. This gives the bettor a consistent, wide range of choices, providing the bettor greater utility, enjoyment and potential to apply his or her knowledge and skill.

Furthermore, unlike horse and dog pari-mutuel wagering, the present system does not rely on a single statistic (i.e., time) to determine the winners and losers. The only element considered in horse and dog pari-mutuel wagering is time (i.e., the horses and dogs are ranked solely by the time it takes for them to complete a race). With the present invention, a plurality of different statistics may be employed to determine rank. For example, a quarterback may pass for 300 yards and throw for 4 touchdowns, but that does not necessary correlate to whether the quarterback will win his or her game. The same is true for baseball players who hit multiple home runs in a game. This provides bettors and system operators a much wider variety of options and considerations when placing and crafting different types of wagers.

Moreover, with horse and dog pari-mutuel type wagering, all contestants (i.e., horses and dogs) are directly competing with each other at the same place and time. In the present system and method, the contestants (i.e., athletes) may or may not be playing against each other, may or may not be playing at the same location or time, and may be accumulating statistics that are not the sole and/or key drivers of individual or team success.

Other Sports as the Basis of Games

2. Other Football Leagues

Games can be created based on other professional football leagues, such as the Canadian Football League, NFL Europe and the Arena Football League. These leagues have calendar schedules that differ from the NFL's schedule, resulting in wagering games based on this sport to be possible approximately 10 months a year.

College football is also a candidate for games, with games based on Division I, II and III teams and players, conferences, bowl games and championship playoffs.

The same type of variants will apply as in the NFL-based games, with changes, as necessary, due to differing regular season schedules, pre-seasons, post-seasons, playoffs, bowl games and league structures.

3. Baseball

Several baseball leagues exist worldwide that may be of interest to bettors. Games can be created based on professional baseball leagues in the United States (major league and minor league), Japan, Korea and Mexico as well as college baseball in the United States.

Wagers can be placed on where an individual player's statistics will rank compared to the statistics of other players of the same position (e.g., $1^{st}$, $2^{nd}$, $3^{rd}$). The positions of highest interest are likely those positions used as a basis for fantasy baseball games. These positions typically fall into two types, pitcher and position player. Each type may be the basis of a game, with time, player grouping, team and statistical methodology variants.

For the pitcher position games, a pitcher's statistical measures such as wins, losses, saves, innings pitched, strikeouts, walks, hits, earned runs, earned run average, and errors can be used in various weightings to determine a score that can be ranked against others. For the position player games, a player's statistical measures such as hits, home runs, stolen bases, walks, batting average, runs batted in, runs scored and errors can be used in various weightings to determine a score that can be ranked against others.

4. Basketball

Several basketball leagues exist worldwide that can be of interest to bettors. Games can be created based on men's professional basketball leagues in the United States and Europe, women's professional basketball in the United States, plus men's and women's college basketball in the United States.

Wagers can be placed on where an individual player's statistics will rank compared to the statistics of other players ($1^{st}$, $2^{nd}$, $3^{rd}$, etc.). Although there are generally three positions in basketball (i.e., guard, forward and center), the statistics for those positions are similar. Therefore, all positions may be grouped together, with no separate games based on separate positions. The games may have, like the other games, time, player grouping, team and statistical methodology variants.

For the basketball-based games, a player's statistical measures such as minutes played, shooting percentage, free throw percentage, rebounds, assists, personal fouls and points can be used in various weightings to determine a score that can be ranked against others.

5. Hockey

Several hockey leagues exist worldwide that can be of interest to bettors. Games can be created based on professional hockey leagues in Canada and the United States (NHL and minor league), and Europe as well as college hockey in the United States.

Wagers can be placed on where an individual player's statistics will rank compared to the statistics of other players of the same type position (e.g., $1^{st}$, $2^{nd}$, $3^{rd}$). The positions of highest interest are likely those positions used as a basis for fantasy hockey games. These positions typically fall into two types, goaltender and position player. Each type will be the basis of a game, with time, player grouping, team and statistical methodology variants.

For the goaltender games, a goaltender's statistical measures such as goals allowed, saves, goals against average and save percentage can be used in various weightings to determine a score that can be ranked against others. For the position player games, a player's statistical measures such as goals, assists, penalty minutes and plus/minus may be used in various weightings to determine a score that can be ranked against others.

6. Other Sports and Events

Other human sporting events may have utility with respect to the game, depending on bettor interest. These sports include golf, tennis, soccer, vehicle (e.g., auto) racing, Australian football, rugby, cricket, jai-alai, hurling, lacrosse and others. The game types, statistics considered, scoring formulae, and the like, will vary depending on the sport.

Other human contests or events, such as political elections or beauty pageants, also have utility with respect to the present invention. For example, consider an American Presidential election. The presidential election process has a primary process and a general election process. Opportunities exist in both processes for wagering games based on the statistics of the participants.

Typical statistics for a candidate include popular votes and vote percentage. These statistics can be weighted in various fashions to create games. In addition, the candidates can be grouped to create additional games.

For example, assume that in a state primary there are twenty-four total candidates, representing six political parties. In addition to the basic game, where each candidate's statistics are ranked against each other, candidates can be grouped, as well as parties, to create additional games. In this case, a bettor may place wagers on an individual candidate, a party, or groups of parties.

With the wide range of sports and events that occur worldwide, a large number of games will be available throughout the year to provide bettor enjoyment and potential to apply the bettor's knowledge and skill.

According to the present invention, sports wagering is based on a pari-mutuel wagering system, which, by definition, is a system where all bettors are competing for a common pool of funds. Bettors compete against one another rather than against the house.

The scope of the present invention is meant to be that set forth in the claims that follow and equivalents thereof, and is not limited to any of the specific embodiments described above.

What is claimed is:

1. A method for operating a pari-mutuel wagering game, comprising:

receiving funds from a plurality of bettors to create a pool of wagers;

allocating a portion of the pool of wagers as commission to an operator by use of a host computer system;

allocating the remainder of the pool of wagers as a common pari-mutuel fund for paying one or more winning bettors by use of the host computer system;

offering the betters a plurality of betting options by use of an electronic interface, including bets relating to participants involved in a non-athletic human contest, wherein the participants are ranked according to performance statistics;

receiving bets from the bettors by use of the electronic interface;

determining which of the bettors win based on the bets by use of the host computer system; and determining a payout for each winning bettor according to a pari-mutuel strategy by use of the host computer system.

2. The method of claim 1, further comprising:

providing payouts to bettors from the common pari-mutuel fund.

3. The pari-mutuel wagering method of claim 1 wherein the human contest is a political election.

4. The pari-mutuel wagering method of claim 1 wherein the human contest is a beauty pageant.

5. A pari-mutuel wagering method comprising the steps of:

receiving funds from a plurality of bettors to create a pool of wagers;

allocating a portion of the pool of wagers as commission to an operator by use of a host computer system;

allocating the remainder of the pool of wagers as a common pari-mutuel fund for paying winning bettors by use of the host computer system;

offering the bettors a plurality of bets by use of an electronic interface, including bets related to players in a fantasy sports game, wherein players are ranked against other players based on their performance statistics;

taking bets from the bettors by use of the electronic interface, wherein the bets are based on the rankings of players in the fantasy sports game;

determining which bettors win based on the bets by use of the host computer system; and determining a payout for each winning bettor according to a pari-mutuel strategy by use of the host computer system.

6. The pari-mutuel wagering method of claim 5, further comprising:

providing payouts to bettors from the common pari-mutuel fund.

7. The pari-mutuel wagering method of claim 5, wherein the fantasy sports game is a fantasy football game, fantasy baseball game, fantasy basketball, fantasy hockey game, fantasy golf game, fantasy cricket game, fantasy soccer game, or fantasy auto racing game.

8. The pari-mutuel wagering method of claim 5, wherein the fantasy sports game is football and wherein the players include quarterbacks, running backs, wide receivers, tight ends, or kickers.

9. The pari-mutuel wagering method of claim 5, wherein the step of taking bets from the bettors is performed over the internet.

10. The pari-mutuel wagering method of claim 5, wherein the step of taking bets from the bettors is performed over the telephone.

11. The pari-mutuel wagering method of claim 5, wherein the operator is a casino sportsbook.

12. A system for pari-mutuel sports wagering comprising:

a host computer system configured to offer a plurality of bets including bets related to players in a fantasy sports game, wherein players are ranked against other players based on their performance statistics, wherein the host computer system receives funds from bettors to create at least one pool of wagers, and receives bets from the bettors based on the rankings of players in the fantasy sports game, and wherein the host computer system further allocates a portion of the at least one pool of wagers as commission to an operator, determines which bettors win based on the bets, and calculates payouts for the winning bettors based on a pari-mutuel wagering strategy; and an interface which allows bettors to communicate with the host computer system to input funds and bets and to receive payout information.

13. The system of claim 12 further comprising:

one or more input devices which are communicatively coupled to the host computer system and which allow bettors to communicate with the host computer system to input bets remotely.

14. The system of claim 13 wherein the input devices include wireless phones, pagers, computers, voice-over-IP phones, or landline phones.

15. The system of claim 12, wherein the fantasy sports game is a fantasy football game, fantasy baseball game, fantasy basketball, fantasy hockey game, fantasy golf game, fantasy cricket game, fantasy soccer game, or fantasy auto racing game.

16. The system of claim 12, wherein the fantasy sports game is football and wherein the players include quarterbacks, running backs, wide receivers, tight ends, or kickers.

17. A system for pari-mutuel wagering on non-athletic human contests comprising:

a host computer system configured to offer a plurality of bets including bets related to participants in a non-athletic human contest, wherein participants are ranked against other participants based on their performance statistics, wherein the host computer system receives funds from bettors to create at least one pool of wagers, and receives bets from the bettors based on the rankings of participants in the non-athletic human contest, and wherein the host computer system further allocates a portion of the at least one pool of wagers as commission to an operator, determines which bettors win based on the bets, and calculates payouts for the winning bettors based on a pari-mutuel wagering strategy; and an interface which allows bettors to communicate with the host computer system to input funds and bets and to receive payout information.

18. The system of claim 17 wherein the human contest is a political election.

19. The system of claim 1 wherein the human contest is a beauty pageant.

* * * * *